United States Patent [19]

Reisch et al.

[11] Patent Number: 4,946,922
[45] Date of Patent: Aug. 7, 1990

[54] INTERNAL MOLD RELEASE AGENTS FOR POLYISOCYANURATE SYSTEMS

[75] Inventors: John W. Reisch, Guilford; Michael M. Emmett, Durham, both of Conn.

[73] Assignee: The Dow Chemical Company, Midland, Mich.

[21] Appl. No.: 347,110

[22] Filed: May 3, 1989

[51] Int. Cl.$^5$ .............................................. C08L 75/04
[52] U.S. Cl. .................. 528/76; 252/182.18; 252/182.24; 252/182.27; 264/328.1; 264/328.6; 427/385.5; 524/728
[58] Field of Search ............ 528/76; 264/328.1, 328.6; 427/385.5; 252/182.18, 182.24, 182.27; 524/728

[56] References Cited

U.S. PATENT DOCUMENTS

| | | | |
|---|---|---|---|
| 3,726,952 | 4/1973 | Boden et al. | 264/48 |
| 4,024,088 | 5/1977 | Godlewski | 260/2.5 A |
| 4,098,731 | 7/1978 | von Bonin et al. | 521/51 |
| 4,111,861 | 9/1978 | Godlewski | 521/123 |
| 4,130,698 | 12/1978 | Sparrow et al. | 521/130 |
| 4,374,222 | 2/1983 | Meyer | 524/241 |
| 4,442,236 | 4/1984 | Rasshofer et al. | 521/130 |
| 4,487,912 | 12/1984 | Zimmerman et al. | 528/52 |
| 4,519,965 | 5/1985 | Taylor et al. | 264/51 |
| 4,581,386 | 4/1986 | Taylor et al. | 521/125 |
| 4,581,387 | 4/1986 | Werner et al. | 521/128 |
| 4,582,869 | 4/1986 | Waggoner | 524/227 |
| 4,758,604 | 7/1988 | Barron | 521/125 |
| 4,764,537 | 8/1988 | Horn et al. | 521/51 |

FOREIGN PATENT DOCUMENTS 8403288 8/1984 PCT Int'l Appl. .

Primary Examiner—Maurice J. Welsh

[57] ABSTRACT

Disclosed are active hydrogen compositions comprising: (A) an organic polyol having a molecular weight of from about 100 to about 4,000 wherein at least about 40 percent of the available hydroxyl groups are primary; and (B) from about 0.5 to about 10 pph of (A) of a polyamide formed from the reaction of a $C_2$ to $C_{30}$ aliphatic monocarboxylic acid and a relatively high molecular weight amine terminated polyether.

Also disclosed are the molded polyisocyanurate polymers prepared from the above compositions and organic polyisocyanates.

20 Claims, No Drawings

INTERNAL MOLD RELEASE AGENTS FOR POLYISOCYANURATE SYSTEMS

FIELD OF THE INVENTION

This invention relates to active hydrogen compositions and is more particularly concerned with organic polyols containing internal mold release agents and the use of such compositions in the preparation of molded polyisocyanurate polymers.

DESCRIPTION OF THE PRIOR ART

The use of internal mold release agents to facilitate release from the mold of various types of polymers is well documented. Nowhere is the use of such agents more important than in the reaction injection molding of polyisocyanate polyaddition polymers of such types as polyurethanes, polyurethane-ureas, polyureas, and polyisocyanurates.

U.S. Pat. No. 3,726,952 is one of the earliest disclosures to the use of IMR agents in the molding of integral skin polyurethane foams. The agents employed are salts containing at least 25 aliphatic carbon atoms and formed from aliphatic carboxylic acids and either primary amines or amines containing amide or ester groups. No matter what type of amine containing reactant is employed, the active IMR agent is the salt formed between the amine and carboxylic acid. Phosphatides such as the naturally occurring lecithin or fatty alcohol esters of phosphorus acids have been shown to impart mold release properties to polyether polyurethanes as disclosed in U.S. Pat. No. 4,024,088. Further application of amine/carboxylic acid salts as IMR reagents in molded foams is taught in U.S. Pat. No. 4,098,731. In this instance the salts are based on saturated or unsaturated aliphatic or cycloaliphatic carboxylic acids having at least 8 carbon atoms and tertiary amines having a particular nitrogen to carbon ratio and being free of amide or ester linkages.

U.S. Pat. No. 4,111,861 discloses a number of classes of release agents for molded polyurethanes including four general types: (1) mixtures of aliphatic or aryl carboxylic acid of 8 to 35 carbon atoms and a polar compound of a metal containing metal ions with the ions not being in sufficient amount to neutralize the acid; (2) carboxyalkylsiloxanes; (3) aliphatic glyoximes; and (4) aryl modified aliphatic quarternary ammonium salts having between 15 and 50 carbons. Fatty acid esters such as glycerol trioleate, olive oil, peanut oil and the like are disclosed as internal mold release agents for molded foams in U.S. Pat. No. 4,130,698. U.S. Pat. No. 4,374,222 discloses the use of hydroxyl substituted fatty acid amides such as N,N-bis(2-hydroxyethyl)stearamide as IMR agents for molded polyurethanes.

U.S. Pat. No. 4,442,236 discloses the preparation of molded polyurethane and/or polyurea articles having smooth flawless outer skins by incorporating small amounts of olefin based polymers or copolymers such as the polyacrylates in combination with small amounts of metal salts of monocarboxylic acids having at least 8 carbon atoms in the polymer forming mixtures.

One of the earliest disclosures to the use of metal salts of carboxylic acids as IMR reagents for molded polyurethanes appears in WO No. 8403288. In this application, primary and secondary amine compounds act as solubilizers with the optional presence of additional carboxylic acids. RIM elastomers disclosed in U.S. Pat. No. 4,487,912 contain as an IMR a particular class of mono- and dicarboxylic acid containing amides.

Disclosure to the use of zinc carboxylates of 8 to 24 carbon atoms with amine terminated polyethers as IMR reagents in RIM preparation of polyurethane elastomers is described in U.S. Pat. No. 4,519,965. U.S. Pat. No. 4,581,386 is a follow-up disclosure showing the same zinc carboxylates as IMR reagents solubilized in amine or hydroxyl terminated amine-initiated polyethers.

U.S. Pat. No. 4,581,387 is directed to the RIM preparation of polyurethane polyurea polymers wherein the IMR is a carboxylic ester, amide or esteramide prepared by the reaction of a mixture of montanic acid and at least one aliphatic carboxylic acid having 10 or more carbon atoms with at least one active hydrogen compound of molecular weight from 60 to 400 and functionality of at least 2 selected from polyols, alkanolamines and polyamines.

U.S. Pat. No. 4,758,604 teaches the preparation of RIM polyurea systems having improved processability. The disclosed technology shows how to mold polyurea polymers at much lower temperatures (i.e. 180° F. to 250° F.) as opposed to the prior art (i.e. 250° F. to 325° F.) and still retain optimum polymer physical properties. This is accomplished by incorporating into the polymer forming composition a small amount of an amide formed by the reaction of a $C_2$ to $C_{30}$ monocarboxylic acid with a relatively high equivalent weight amine terminated polyether. By lowering the molding temperature accordingly, the metal carboxylate IMR reagents such as zinc stearate or zinc laurate can function properly which they could not otherwise do at the higher prior art molding temperatures.

More exotic IMR reagents are disclosed in U.S. Pat. No. 4,764,537 for the RIM preparation of polyisocyanate addition polymers. The reagents are actually a combination of (1) at least one ketimine, aldimine, enamine, etc.; (2) at least one metal salt of a $C_8$ to $C_{24}$ carboxylic acid; and (3) optionally a carboxylic acid, sulfonic acid, mineral acid, and amidosulfonic acid.

In a somewhat different area of technology, ethylene-bis stearamide has been disclosed in U.S. Pat. No. 4,582,869 as an effective mold release agent for polymer blends of polyoxymethylenes with polyurethanes.

The metal carboxylate salts have been the mainstay for IMR RIM technology. However, they suffer from a number of drawbacks not the least of which is the adverse effect they exert on catalytic activity in the various types of polyisocyanate addition processes. This adverse effect is generally observed as a tendency to increase reactivity, thus leading to more rapid polymer gelation. This leads to particular problems in the molding of polyisocyanurates, especially when mat molding is involved. One of the major difficulties encountered is polymer gelation before the reinforcing mat material is completely, and, efficiently, wetted out. The other known IMR agents have their own specific problems also; for example, silicone IMR agents result in paintability problems for the molded part and even paint line contamination; the phosphorus containing types such as lauryl acid phosphate cause foaming and reactivity loss.

Accordingly, there still remains a need for an efficient IMR system which can be effectively applied to the molding of polyisocyanurate polymers and particularly those moldings containing reinforcing mats.

SUMMARY OF THE INVENTION

The present invention is directed to active hydrogen compositions comprising:

(A) an organic polyol having a molecular weight of from about 100 to about 4,000 wherein at least about 40 percent of the available hydroxyl groups are primary; and (B) from about 0.5 to about 10 p.p.h. of (A) of a polyamide formed from the reaction of a $C_2$ to $C_{30}$ aliphatic monocarboxylic acid and a relatively high molecular weight amine terminated polyether.

The invention is also directed to a process for the preparation of a molded polyisocyanurate polymer comprising reacting in the presence of a trimerization catalyst: (I) an excess of organic polyisocyanate and (II) an active hydrogen composition defined above.

Surprisingly, the use of the present polyamides (B) regardless of their solubility characteristics in the precursor active hydrogen compositions, display their optimum release properties as they become more insoluble or incompatible in the resultant molded polymer. As a direct result of this phenomenon, they provide an unexpectedly large number of mold releases before any mold cleaning and/or reconditioning is required.

Even more surprising, along with the high number of parts released, their physical properties are not adversely affected. No significant plasticization can be observed and their flex strength and heat resistance are not lowered. The culmination of these unexpected benefits is seen in the RIM preparation of composites having at least one fibrous mat element. The mat molded parts can be made in a surprisingly high number of releases and with each part enjoying physical properties equal to or superior to those parts not containing the release agent (B).

The active hydrogen compositions find their principal utility in the preparation of the above noted polyisocyanurate polymers. The polymers themselves can be used in a wide variety of applications wherein structural RIM products are already being employed inclusive of molded automotive parts such as doors, hoods, skirts, spare wheel covers, and the like, and structural parts like cabinetry for heavy electronic equipment, satellite reflector dishes, and the like.

DETAILED DESCRIPTION OF THE INVENTION

The active hydrogen compositions defined above are readily prepared using any conventional means known to one skilled in the art for mixing together liquid or liquid/solid components. This includes mixing (A) and (B) together manually or mechanically in small scale handmix procedures in suitable containers such as beakers, flasks, pails, and the like, up to large scale batch or continuous mixing in stirred kettles, vats, tanks, and the like. It is preferable, particularly if the compositions are not to be used immediately, and, are storage stable (completely miscible), that the components be mixed under the exclusion of air and atmospheric moisture. This is most readily accomplished by mixing under a positive pressure of an inert gas such as nitrogen, argon, and the like. Heating may or may not be necessary to effect the formation of the blends. For the most part, the (B) components are liquids and, therefore, can simply be mixed with (A) under ambient temperatures. In the event (B) is a solid or very viscous material, then the components are heated together until miscible or at least uniformly suspended in each other. Heating temperature is in no way critical and advantageously will fall within a range of from about 35° C. to about 150° C.

It should be noted that (A) and (B) need not be soluble in each other to operate with optimum IMR properties in accordance with the present invention. In fact, optimum release properties for the resulting molded parts are observed for those compositions of (A) and (B) which are not soluble in each other. Furthermore, the miscibility of the components depends largely on the primary/secondary hydroxyl ratios to be found in the (A) portion. This aspect of the present invention will be discussed in more detail below. Suffice it to say, the active hydrogen compositions of the invention can range from completely storage stable miscible blends to immiscible blends which must be agitated or stirred immediately before reaction with a polyisocyanate component. All of the components individually are well known in the art and the novelty resides in their particular selection for combination and their utility in preparing polyisocyanurate polymers.

The organic polyol component (A) plays a critical role in combination with (B) not only in respect of the release properties of the molded polyisocyanurate parts but also in respect of the solubility of (B) in (A). It would obviously be preferable to have an active hydrogen composition which is completely miscible and storage stable. This would allow the preparation, handling, transportation, and storage of the blend without the need for any agitation prior to reaction with polyisocyanate. Unfortunately, if polyols are chosen for (A) which are all secondary in their hydroxyl functionality, while they form miscible blends with (B), they do not provide for the facile release of the molded polyisocyanurate parts. Primary hydroxyl functionality is necessary in order to meet the requirements of the present invention. Accordingly, the polyol (A) must have at least about 40 percent of the available hydroxyl groups as primary hydroxyls. This proportion can be supplied from either a single polyol or mixture of polyols so that of the total of primary and secondary groups available, 40 percent are primary hydroxyls. Now it is to be understood that 100 percent primary hydroxyl content in (A) will give rise to the optimum mold release properties of the polyisocyanurate parts. Accordingly, from the standpoint of the process in accordance with the present invention, the primary hydroxyl content of (A) can fall in a range of from about 40 percent to about 100 percent with the complementary secondary hydroxyl being about 60 to 0 percent. However, in order to provide for blend compatibility, it is desirable to have some secondary hydroxyl present. Accordingly, it is preferred to have a primary hydroxyl content from about 40 percent to about 80 percent and secondary content of about 60 to about 20 percent. By operating within these preferred ranges, the availability of miscible blends is more readily ensured.

The organic polyol can be any polymeric polyol or mixture of polyols provided it has at least 2 hydroxyl groups and meets the primary/secondary hydroxyl content limitations set forth above and a molecular weight from about 100 to about 4,000 or average value thereof in the case of mixtures of polyols. Generally speaking, the functionality is from about 2 to about 6 or average value thereof and includes polyether polyols, polyester polyols, reinforced or polymer polyols, polycarbonate polyols, resole polyols, polybutadiene based polyols, and the like. Preferably, (A) is a polyalkyleneoxy polyol or mixture thereof wherein the functionality is from about 2 to about 3 with a molecular weight from about 200 to about 1,000. Mixtures of polyols can be employed whose average primary/secondary hydroxyl content, functionality and molecular weights meet the limitations set forth above.

Illustrative, but not limiting, of the classes of polyols which can be used are the polyoxyalkylene polyethers; polyester polyols; polyol adducts derived from ethylene oxide with methylenedianiline and polymethylene polyphenylamine mixtures (in accordance with U.S. Pat. No. 3,499,009); polyols obtained by the Mannich condensation of a phenolic compound with formaldehyde, an alkanolamine, and ethylene oxide (in accordance with U.S. Pat. No. 3,297,597); vinyl reinforced polyether polyols, e.g. by the polymerization of styrene or acrylonitrile in the presence of the polyether; polyacetals prepared from glycols such as diethylene glycol and formaldehyde; polycarbonates, for example those derived from butanediol with diarylcarbonates; polyester amides; the resole polyols (see *Prep. Methods of Polymer Chem.* by W. R. Sorenson et al., 1961, page 293, Interscience Publishers, New York, N.Y.); and the polybutadiene resins having primary hydroxyl groups (see *Poly Bd. Liquid Resins*, Product Bulletin BD-3, Oct. 1974, Arco Chemical Company, Div. of Atlantic Richfield, New York, N.Y.).

A most preferred group of polyols to be used in mixtures and, those from which the attributes of the present invention are best exemplified, comprise the polyoxyalkylene diols having a molecular weight from about 200 to about 1,000. Such polyols are typically exemplified in the polypropyleneoxy diols, polyethyleneoxy diols, and polypropyleneoxy-polyethyleneoxy capped diols which can be used in such combinations so as to provide the primary/secondary hydroxyl contents set forth above. Particularly preferred are blends of polyethyleneoxy diols and polypropyleneoxy diols wherein either component has a molecular weight of from about 300 to about 600 and the average primary hydroxyl/secondary hydroxyl is from about 40/60 to 80/20.

The polyamide component (B) is formed from the reaction of a $C_2$ to $C_{30}$ aliphatic monocarboxylic acid or mixture of acids having an average of about 2 to about 30 carbon atoms with a relatively high molecular weight amine terminated polyether. The term "relatively high" means the molecular weight can be as high as about 10,000. Preferably, the molecular weight of the amine terminated polyether falls within a range of from about 200 to about 8,000. It will be evident to those skilled in the art that the number of amide groups which will ultimately be formed in said polyamide will depend on the number of amine groups present in the starting material. Any number of amine groups may be present which will form the corresponding number of amides in the polyamide (B). However, in order to provide for optimum mold release properties in combination with compatibility properties with the polyol component (A), the number of resultant amide groups is preferably from about 2 to about 4, even more preferably, about 2 to about 3. Also, while secondary or primary amine groups may be present, it is the primary amine functionality which is preferred.

Especially preferred amine-terminated polyethers are polymers of propylene oxide and/or ethylene oxide which are terminated with primary and/or secondary amine groups. Such amine-terminated polyethers can be prepared, for example, from the corresponding polyether polyol by reacting it with ammonia or a primary amine in a reductive amination as taught in U.S. Pat. No. 4,152,353. Alternatively, the amine-terminated polyether can be prepared by reacting the corresponding polyether polyol with o- or p-nitro chlorobenzene and subsequently reducing the nitro groups to amine groups. Secondary amine-terminated polyethers can be prepared by reductively aminating the corresponding polyether polyol and reacting the resulting primary amine groups with acrylonitrile or other unsaturated compound which undergoes a Michael addition reaction with a primary amine. In most of the synthetic methods for making amine-terminated polyethers, the amination does not go to completion. Accordingly, it is within the scope of this invention to use materials in which about 50–100% preferably about 60–95% of the hydroxyl groups have been converted to amine groups. It is also within this invention to employ a small quantity of a relatively high equivalent weight polyol, as long as at least 50% of the total number of active hydrogen-containing groups provided by the relatively high equivalent materials are amine groups.

A typical class of commercially available amine terminated polyethers are those supplied by Texaco Corporation under the trade name of Jeffamines, such as Jeffamine D-230, Jeffamine T-403, Jeffamine D-2000, Jeffamine T-3000, Jeffamine T-5000, and the like; these represent primary amine terminated polyethers falling within a molecular weight range of from about 200 to about 8,000 and amine functionality from about 2 to about 3.

The aliphatic monocarboxylic acid can be a saturated or unsaturated acid preferably having from about 8 to about 20 carbon atoms. Accordingly, a preferred polyamide (B) is prepared from at least one monocarboxylic acid from this group and a primary amine terminated polyether having a molecular weight from about 200 to about 8,000 and functionality from about 2 to about 3, thereby forming a di- or triamide (B) or average value falling therebetween. A most preferred polyamide is prepared from a monocarboxylic acid having from 12 to 20 carbon atoms and the primary di- or triamine polyethers having molecular weights from about 1,000 to about 6,000.

Suitable acids include caprylic acid, capric acid, myristic acid, palmitic acid, palmitoleic acid, stearic acid, oleic acid, lauric acid, linoleic acid, linolenic acid, α-eleostearic acid, ricinoleic acid, behenic acid, montanic acid, octylbenzoic acid, decylbenzoic acid, dodecylbenzoic acid, oleoyl sarcosine, stearoyl sarcosine, and the like.

A preferred group of acids comprises stearic acid, oleic acid, lauric acid, linoleic acid, palmitic acid, and mixtures thereof.

In making the amide, the amine-terminated polyether and the acid are advantageously reacted together in substantially equivalent proportions at an elevated temperature until substantially all of the acid groups are consumed. The reaction can be monitored by techniques including infrared spectroscopy or determination of an acid number to determine when substantially all of the acid groups have been consumed. Preferably, the amide has an acid number of less than 30, preferably less than about 15.

The polyamide can be incorporated with the polyol, in sufficient proportions to provide the desired number of releases of a molded polyisocyanurate part. Additionally, this amount can also be selected not only on the basis of mold release, but also based on the miscibility of the particular polyamide and polyol components in hand. Advantageously, the amount will fall within the range of from about 0.5 to about 10 parts per hundred (pph) of polyol (A). Preferably, the proportions are from about 1.0 to about 8.0 pph.

As noted previously, the compositions in accordance with the present invention need not be compatible in order to provide the high number of mold releases for the polyisocyanurate polymers. Accordingly, when these polyols and polyamides are employed in preparing polyisocyanurate polymers, they need not be employed as premixed blends but can be added, if desired, separately to the reaction site. However, when the blends are to be prepared in miscible form for shipment, storage and the like, then the selection of the particular components and proportions which give rise to miscibility can be made. This aspect of the present invention has been discussed above in respect of the relationship between polypropyleneoxy content of the polyol and solubilizing of the polyamide.

The active hydrogen compositions or their components find particular utility, and, indeed result in another aspect of the present invention, in the preparation of molded polyisocyanurates. These polymers are prepared by bringing together (I) an organic polyisocyanate and (II) active compositions in accordance with the above disclosure in the presence of a trimerization catalyst in such proportions that the equivalents of (I) are in stoichiometric excess over (II). The ingredients are brought together using any of the manual or machine mixing techniques known to this art. The molding operation can also be any of the known molding operations such as open or closed molds, casting the reactants into open molds which are then closed with vice clamps, pneumatically, or mechanically operated molds automatically opened and closed on a continuous turntable operation, and the like. A particularly facile and preferable method is the RIM procedure operated either in a static or continuous mode using the procedures for automatically opening/closing the molds, etc. Particular reference to RIM techniques can be found in U.S. Pat. Nos. 4,272,618; 4,296,212; 4,374,210; 4,433,067; 4,435,349; and 4,546,114 which patent disclosures relative thereto are incorporated herein by reference.

Any of the organic polyisocyanates employed in the art for the preparation of molded polyurethanes can be used herein. Included are di- or higher functionality aliphatic or aromatic polyisocyanates. The preferred class comprises the aromatic polyisocyanates.

Illustrative, but not limiting thereof, are 1,6-hexamethylene diisocyanate, 1,4-cyclohexylene diisocyanate, 4,4'-methylenebis(cyclohexyl isocyanate), m- and p-phenylene diisocyanate, 2,4- and 2,6-toluene diisocyanate and mixtures of these two isomers, methylenebis(phenyl isocyanate) inclusive of 4,4'-methylenebis(phenyl isocyanate), 2,4'-methylenebis(phenyl isocyanate), and mixtures of these methylenebis(phenyl isocyanate) isomers, 3,3'-dimethyl-4,4'-diisocyanatodiphenyl methane; liquefied forms of methylenebis(phenyl isocyanate) particularly liquefied forms (including mixtures containing up to about 50 percent of the 2,4'-isomer) of 4,4'-methylenebis(phenyl isocyanate) such as the carbodiimide-containing 4,4'-methylenebis(phenyl isocyanates) having isocyanate equivalent weights of from about 130 to about 180 prepared for example by heating 4,4'-methylenebis(phenyl isocyanate) with a carbodiimide catalyst to convert a portion of said isocyanate to carbodiimide; and liquefied forms of 4,4'-methylenebis(phenyl isocyanate) which have been reacted with minor amounts (from about 0.04 to about 0.2 equivalent per equivalent of isocyanate) of low molecular weight glycols such as dipropylene glycol, tripropylene glycol, and mixtures thereof; isocyanate terminated prepolymers having an isocyanate content of about 9 to about 20 percent by weight prepared from methylenebis(phenyl isocyanate) and a polyol having a functionality from 2 to 3 selected from polyalkyleneoxy polyols of molecular weight 1000 to 10,000, polytetramethylene glycols of molecular weight 600 to 5000, and polyester polyols of molecular weight 500 to 8000, said polyol and said methylenebis(phenyl isocyanate) being reacted in the proportions of about 0.01 equivalent to about 0.5 equivalent of said polyol per isocyanate equivalent; blends or mixtures of the liquefied methylenebis(phenyl isocyanates) with each other and with the isocyanate terminated prepolymers described above in any proportions desired; polymethylene poly(phenyl isocyanate) mixtures containing from about 20 percent to about 85 percent by weight (preferably about 30 to about 60 percent) of methylenebis(phenyl isocyanate), with the balance of 80 to 15 percent by weight (70 to 40 percent) of the mixtures being polymethylene poly(phenyl isocyanates) of functionality higher than 2; included in the polymethylene poly(phenyl isocyanates) are those having the 4,4'-methylenebis(phenyl isocyanate) isomer and mixtures including up to about 30 percent of the corresponding 2,4'-isomer; mixtures of any of the above polyisocyanates can be employed. Particularly preferred are the polymethylene poly(phenyl isocyanates).

In its broadest scope the polymers can be prepared from any of the active hydrogen compositions and organic polyisocyanates set forth above. However, the preferred polymers are prepared by the reaction injection molding of (I) an aromatic polyisocyanate, (II) an active hydrogen composition comprising (A) a polyalkyleneoxy diol or triol having a molecular weight from about 200 to about 1,000 and wherein at least about 40 percent of the available hydroxyl groups are primary; (B) from about 1.0 to about 8.0 pph of (A) of a polyamide formed from the reaction of a monocarboxylic acid selected from the group consisting of stearic acid, oleic acid, lauric acid, linoleic acid, palmitic acid, and mixtures thereof and a primary amine terminated polyether having a molecular weight from about 1,000 to about 6,000 and a functionality from about 2 to about 3; and (III) a trimerization catalyst, wherein the proportions of reactants are such that the ratio of isocyanate equivalents to total active hydrogen equivalents falls within the range of from about 1.5 to about 5, preferably from about 2 to about 4.

The detailed description above regarding the preferred polyols, polyamides, and the like apply with equal force in the preparation of the preferred polyisocyanates.

The trimerization catalyst can be any catalyst known to those skilled in the art which will catalyze the trimerization of an organic isocyanate compound to form the isocyanurate moiety. For typical isocyanate trimerization catalysts see The Journal of Cellular Plastics, Nov./Dec. 1975, page 329. Illustrative trimer catalysts include the following groups: (1) Tertiary amine compounds which include N,N-dialkylpiperazines such as N,N-dimethylpiperazine, N,N-diethylpiperazine and the like; trialkylamines such as trimethylamine, triethylamine, tributylamine and the like; 1,4-diazabicyclo[2.2.-2]octane, which is more frequently referred to as triethylene diamine, and the lower-alkyl derivatives thereof such as 2-methyltriethylenediamine, 2,3-dimethyltriethylene diamine, 2,5-diethyltriethylene diamine and 2,6-diisopropyltriethylene diamine; N,N',N''-tris(dialkylaminoalkyl)hexahydrotriazines such as N,N',N''-tris(dimethylaminomethyl)hexahydrotriazine, N,N',N''-tris(dimethylaminoethyl)hexahydrotriazine, N,N',N''-tris(dimethylaminopropyl)hexahydrotriazine; mono-, di-, and tri(dialkylaminoalkyl)monohydric phenols or thiophenols such as 2-(dimethylaminomethyl)phenol, 2,4-bis(dimethylaminomethyl)phenol, 2,4,6-tris(dimethylaminomethyl)phenol, and the like; N,N,N',N'-tetraalkylalkylenediamines such as N,N,N',N'-tetramethyl-1,3-propanediamine, N,N,N',N'-tetramethyl-1,3-butanediamine, N,N,N',N'-tetramethylethylenediamine N,N,N',N'-tetraethylethylenediamine and the like; N,N-dialkylcyclohexylamines such as N,N-dimethylcyclohexylamine, N,N-diethylcyclohexylamine, and the like; N-alkylmorpholines such as N-methylmorpholine, N-ethylmorpholine and the like; N,N-dialkylalkanolamines such as N,N-dimethylethanolamine, N,N-diethylethanolamine and the like; N,N,N',N'-tetraalkylguanidines such as N,N,N',N'-tetramethylguanidine, N,N,N',N'-tetraethylguanidine and the like. The preferred tertiary amine catalysts for use in the process of the invention are triethylene diamines, the N,N',N''-tris(dialkylaminoalkyl)hexahydrotriazines, the mono(dialkylaminoalkyl)phenols, and the 2,4,6-tris(dialkylaminoalkyl)phenols. (2) Alkali metal salts of lower alkanoic acids such as the sodium, potassium, or lithium salts of formic acid, acetic acid, propionic acid, butyric acid, isobutyric acid, valeric acid, caproic acid, heptanoic acid, caprylic acid, 2-methylhexanoic acid, 2-ethylhexanoic acid, and the like. A preferred member of this group is potassium 2-ethylhexanoate. (3) Combinations of an alkali metal salt of an N-substituted amide with an alkali metal salt of an N-(2-hydroxyphenyl)methyl glycine; and optionally a tertiary amine trimerization catalyst in accordance with the teaching of U.S. Pat. No. 3,896,052. (4) Combinations of a tertiary amine trimerization catalyst with an alkali metal salt of an N-substituted amide and a dibutyl tin di(alkanoate) in accordance with the teaching of U.S. Pat. No. 3,899,443. (5) Combinations of monomeric epoxides with a tertiary amine trimerization catalyst containing a dimethylamino group and an alkali metal salt of an N-(2-hydroxyphenyl)methyl glycine in accordance with the teaching of U.S. Pat. No. 3,903,018. (6) Combinations of a tertiary amine trimerization catalyst and a quaternary ammonium salt of an alkanoic acid in accordance with the teaching of U.S. Pat. No. 3,954,684.

Generally speaking, the proportions of trimer catalyst will fall within a range of about 0.001 to about 5 percent based on the total polyisocyanurate forming ingredients.

Generally speaking, a urethane catalyst is not required in the present process, mainly because the trimer catalyst can also act to catalyze the urethane formation between hydroxyl and isocyanate. In the event that a separate urethane catalyst is desired, then any of the tertiary amine compounds under (1) above can be employed, or, alternatively, specific known urethane catalysts can be employed.

In an optional embodiment the polyisocyanurate resin employed can be filled or reinforced in order to provide so-called RRIM articles. The fillers can be any of the conventional materials used in the art. Typically, these include flaked or milled glass, glass fibers in lengths of from about 1/16 inch to ¼ inch, glass strands, and the like, alumina, titanium dioxide, calcium carbonate, talc, carbon black, powdered gypsum, natural clays such as kaolin, china clay, chopped rubber scrap, natural silica, and the like.

The fillers can be used in proportions of from about 1 to about 50 percent by weight based on the resin forming ingredients, and, preferably, from about 5 to about 30 percent by weight.

Other optional additives can be employed in the resin forming ingredients. Typical of such additional components are wax lubricants, antioxidants, flame retardants, colorants, and the like. Typical but non-limiting flame retardant additives are the phosphorus containing flame retardants including those having active hydrogen reactivity (hydroxyl and amine groups) such as dibromoneopentyl glycol, tris(2-chloroethyl)phosphate, tris(2-chloropropyl)phosphate, tris(2,3-dibromopropyl)phosphate, tri(1,3-dichloroisopropyl)phosphate, and the like.

A most preferred embodiment of the present invention is carried out in the presence of at least one fibrous mat thereby forming a molded composite article. It is in the preparation of such high strength molded composites wherein the present active hydrogen compositions excel. That is to say, the fibrous mats are thoroughly and rapidly filled with the resin matrix before gelation occurs and provide for large numbers of releases from the mold before any mold refurbishment is required.

The term "composite" as it refers to the products made in accordance with the present invention has the significance generally accepted in the molding art to include the use of fibrous matted material embedded into, or impregnated by, the resin component which in the present case is a polyisocyanurate resin. The term does not include loose fibrous material. The term includes in its scope mat molded RIM (or MMRIM) articles.

The term "fibrous mat" does mean a fibrous material in the form of a mat. The fibrous components can be held within the mat form by mechanical forces but more often by the use of a polymeric adhesive such as a polyvinyl acetate, polyester, polyepoxide, and the like, or else by being woven or stitched. The fibrous arrangement in the mat can be random or oriented, and the like. Illustratively the fibrous material can be glass fiber, or an organic fiber inclusive of graphite fiber, polyester fiber, polyamide fiber, polyaramid fiber, and the like. The above fibrous materials are meant to be exemplary only with the present process not limited solely to these examples. Any fibrous mat material can be employed in the present method. Although glass fibrous material is most preferred in the weight proportions set forth below.

At least one mat is employed in the process of the invention and preferably a plurality thereof with the only limitation in numbers being imposed by practical considerations and by the thickness of the molded part being prepared and the thickness of the mats involved.

The mats are placed in the mold either manually or by a mechanical delivery system prior to placing the mold cover in position. The weight percent contributed to the composite will vary considerably depending on the type of fibrous material employed. Advantageously, it will fall within the range of from about 10 to about 70 weight percent, preferably from about 10 to about 60 weight percent.

Although it is not an essential requirement in the process of the present invention, it is preferred that the molds be at a temperature above ambient room temperatures when they receive the resin forming ingredients. Advantageously, the mold temperatures fall within the range of from about 120° F. to about 300° F., preferably from about 160° F. to about 220° F. Postcuring of the molded parts is optionally performed at temperatures within a range of from about 250° F. to about 350° F. for periods of from about 30 minutes to about 1 hour.

The advantage of the present process lies primarily in the high number of releases which can be made for any given molding cycle before any mold reconditioning is required. It is in the molding of the composites that the number of releases is so unexpectedly high. In fact, in a RIM process with glass fiber mats the number of releases can well exceed 30.

Additionally, these high number of releases are readily obtained when making the high strength mat molded composites. The term "high strength" means having a flex modulus of at least 500,000 psi and preferably from about 500,000 to about 5,000,000 psi.

The following examples describe the manner and process of making and using the invention and set forth the best mode contemplated by the inventors of carrying out the invention but are not to be construed as limiting.

EXAMPLE 1

This experiment describes the preparation of a number of active hydrogen compositions in accordance with the present invention and their reaction with an organic polyisocyanate to form molded polyisocyanurates also in accordance with this invention (runs 3 to 9 in Table I and runs 10 and 11 in Table II). Comparison compositions not of this invention and their corresponding polyisocyanurate polymers are set forth as runs 1 and 2 (Table I) and comparison runs 1 and 2 (Table II).

The same general procedure is used throughout and is as follows. A B component is prepared by blending together in the following proportions 32.5 parts of a 400 molecular weight polyethyleneoxy glycol, 32.5 parts of a 425 molecular weight polypropyleneoxy glycol, and 1.5 parts of an isocyanate trimerization catalyst consisting of fifty percent by weight solution of sodium N-(2-hydroxy-5-nonylphenyl) methyl sarcosinate dissolved in diethylene glycol. This basic B component is used for the runs 1 through 9 of Table I. The B component used for the Table II runs differs from the above only in the proportions of the two diols employed. The polyethyleneoxy diol and polypropyleneoxy diol being used are in the respective amounts of 26 parts and 39 parts. The variation amongst all the runs resides in the internal mold release (IMR) agent included with each particular blend. In those cases where the IMR is solid, the blend is simply heated and stirred until solution is complete. Most cases did not require heating. Run 1 which is a control contains no IMR, while run 2 contains 3 parts of oleoamine. The B blends for runs 3 to 9 of Table I each contain 3 parts of their particular amides obtained from the reactions of the various di- and triamine terminated polyether components as set forth in Table I with either the equivalent amounts of oleic acid or mixtures of oleic with dodecanedioic acids.

The amide IMRs are previously prepared by charging the amine and carboxylic acid reactants to a reaction flask in the absence of any catalysts. A gentle exotherm of neutralization is observed between 20° C. to 30° C. The reaction mixture is heated to 150° C. during stirring and reaction to amide is completed by heating the mixture under about 0.2 mm of mercury pressure with a nitrogen bleed below the liquid surface. G.P.C. of the amide product shows a very minor proportion of unreacted carboxylic acid (from about 2 to about 5 percent depending on reactants). Infrared analysis shows the amide carbonyl absorption at 1670 cm$^{-1}$. The physical states of the respective products are set forth in Table I under the heading of IMR Viscosity at 25° C. The various amine terminated polyethers are described in the footnotes to Table I.

The appearance of the various blends with their IMR agents are described in Table I along with the appearance of their resulting molded polymer products. It will be noted that the active hydrogen compositions are either homogeneous (or clear) or else inhomogeneous (or 2 phase). In the case of the control or run 1 without IMR the B component is clear. The B component for run 2 not of the invention has 2 layers. For the compositions of runs 3 to 9 in which the primary/secondary hydroxyl content is about 50/50, at the lower end of the molecular weight range of the amide IMR's the B composition is 2 phase (run 3). As the amide molecular weight increases (runs 4 to 7) the blends become homogeneous until the higher weights are reached (runs 8 and 9) and the compositions are again 2 phase. No relationship between the miscibility of the B blend and the ease of release for the final molded parts is observed. However, as noted below, a direct relationship between ease of mold release and the homogeneity of the polyisocyanurate polymer is observed. From an experimental standpoint, B blend compatibility is to be preferred and this can be controlled somewhat by the ratio of primary to secondary hydroxyls present in the blend. Generally speaking, the higher the secondary content (due to propyleneoxy content), the greater the miscibility of all the components.

Hand-cast polyisocyanurate polymers are prepared from each blend by rapidly mixing it in the above stated proportions with 133 parts of a polymethylene poly(phenyl isocyanate) mixture comprising a methylenebis(phenyl isocyanate) content of about 65 percent by weight and the remainder comprising polymethylene poly(phenyl isocyanate) of functionality greater than 2 (I.E.=about 133). The mixing is carried out in a plastic beaker using a rapidly stirring electric drill press motor for about 10 seconds and the reactants are quickly poured into a chrome plated steel plaque mold measuring 8"×8"×⅛" and heated to 210° F. Mold preparation prior to each series of test runs according to Table I include first the washing of the mold with dimethylformamide followed by acetone; then the mold is coated with an external mold release agent (Chemtrend RCT-2044) and buffed with a clean cloth. This mold preparation is repeated between each one of the runs 1 to 9. Within each series, the hand-casting is repeated until either the parts cannot be removed without great difficulty or else the number of releases easily reaches 20 moldings with no sign of sticking. Judgment of release properties is made on the subjective basis of how much (qualitative) force is needed to pry the piece from the mold. An easy release is one where the whole part pops loose once one corner is separated from the mold surface. As release becomes more difficult, more force is required to peel the part from the mold until the point where it is extremely difficult. The results set forth in Table I include the appearance of the molded part, the release characteristics with the actual number of parts, and the qualitative relative rating. The polymer appearance in the molded parts is significant in relation to its relative ease of mold release. The liquid formulations for all the runs are indistinguishable prior to gelation but not after. At the gel point some of the molded parts rapidly "blush" to a light chocolate colored opacity, while others remain clear. This opacity is referred to in Table I as 2-phase. The data shows clearly that the latter state favors good mold release, while the clear parts release less favorably to poorly. It is to be noted that a similar relationship between polymer release and the compatibility of the B component does not exist.

Under the present test conditions the control run 1 shows very poor release with only 3 parts removed with the last part removed only with great difficulty. Run 2 with the oleoamine, while allowing 7 releases, all are poor releases because of the force required. Beginning at run 3, 15 releases are reached before force is required. Run 5 containing the dodecanedioic acid with the oleic appears to hinder the release process compared with run 4 because subsequent releases after 3 require considerable force to remove the part, although 15 releases can be reached. As the molecular weight of the amide goes up, the release properties dramatically improve in runs 6 to 9. The runs are stopped after 20 releases with no evidence of sticking. Apparently, the positive effect of the T-5000 component of the amide overrides the negative effect of the presence of the dodecanedioic acid portion because runs 9 and 8 show the same release properties.

A comparison run not shown in Table I is made wherein the B side contains only the polypropyleneoxy glycol with no polyethyleneoxy glycol. The resulting hand-cast polyisocyanurate part is observed to have only 4 releases.

The relative ratings of A to C- are assigned to each run so as to more easily rate the runs from 1 to 9 in respect of their mold release properties.

In order to determine the effects, if any, on polymer properties, the molded polyisocyanurate runs 10 and 11 are carried out identically to those described above using the same ingredients and proportions except for the change in primary/secondary hydroxyl proportions noted above to provide B component compatibility. The IMR agent selected is identical to the triamide made from the T-5000 triamine and equivalent proportions of oleic acid as set forth in run 8. Run 11 differs from 10 by subjecting the molded polyisocyanurate to a postcuring step of 350° F. for 30 minutes. Similarly, comparison 2 is subjected to postcuring while comparison 1 is not. However, both of these comparison polymers lack an IMR component.

The flex properties and heat resistance properties are determined on the four samples as set forth in Table II. The data for the runs 10 and 11 do not show any significant amount of plasticization from the amide IMR component with HDT, heat sag, and flexural strength being essentially maintained.

TABLE I

| | IMR Composition[1] (eq. pts.) | IMR Visc. (25° C.) | Appearance B Comp. | Appearance Polymer | Release (#) | Relative Rating[2] |
|---|---|---|---|---|---|---|
| 1 | Control | — | Clear | Clear | Very poor (3) | C− |
| 2 | Oleoamine | Solid | 2 Phase | Clear | Poor (7) | C |
| 3 | D-230[3]/oleic (1/1) | Solid | 2 Phase | Clear | Good (15) | B |
| 4 | D-400[4]/oleic (1/1) | — | Clear | Clear | Good (15) | B |
| 5 | D-400/oleic/DD[5] (2/1/1) | 6378 | Clear | Clear | Fair (15) | C+ |
| 6 | D-2000[6]/oleic (1/1) | 938 | Clear | 2 Phase | Better (20+) | B+ |
| 7 | D-2000/oleic/DD (1/0.33/0.67) | 6220 | Clear | 2 Phase | Better (20+) | B+ |
| 8 | T-5000[7]/oleic (1/1) | 1783 | 2 Phase | 2 Phase | Best (20+) | A |
| 9 | T-5000/oleic/DD (1/0.6/0.4) | 4784 | 2 Phase | 2 Phase | Best (20+) | A |

Footnotes to Table I
[1] IMR Composition: denotes equivalent proportions in which the polyamine and carboxylic acid components are reacted to form the amide IMR.
[2] Relative Rating: denotes a qualitative scale from A to C− for rating relative ease of part release from the mold, i.e. the amount of manual force required to remove the plaque from the mold.
[3] Jeffamine D-230: A polypropyleneoxy glycol which has been aminated to form a diamine having a molecular weight of about 230 and an amine equivalent weight (based on the titration of one proton per primary amine) of about 115; supplied by Texaco Chemical Inc., White Plains, N.Y.
[4] Jeffamine D-400: An aminated polypropyleneoxy glycol similar to D-230 above except of higher molecular and amine eq. wt. of about 400 and 200 respectively, also supplied by Texaco Inc.
[5] DD: dodecanedioic acid.
[6] Jeffamine D-2000: An aminated polypropyleneoxy glycol similar to the above diamines with molecular and amine equivalent weights of about 2,000 and 1,000 respectively, supplied by Texaco Inc.
[7] Jeffamine T-5000: An aminated polypropyleneoxy triol of molecular weight about 5,000 and amine functionality between about 2.5 and 3, supplied by Texaco Inc.

TABLE II

| Run | Comp. 1 | 10 | Comp. 2 | 11 |
|---|---|---|---|---|
| Ingredients[1] (pts. by wt.) | | | | |
| Component A | | | | |
| Polyisocyanate | 133 | 133 | 133 | 133 |
| Component B | | | | |
| Polyethyleneoxydiol (400 MW) | 26 | 26 | 26 | 26 |
| Polypropyleneoxydiol (425 MW) | 39 | 39 | 39 | 39 |
| Trimerization catalyst | 1.5 | 1.5 | 1.5 | 1.5 |
| T-5000 oleamide | — | 3.0 | — | 3.0 |
| NCO/OH Index | 3.2 | 3.2 | 3.2 | 3.2 |
| Postcuring (350° F./30 min.) | No | No | Yes | Yes |
| Polymer Properties | | | | |
| HDT[2] at 264 psi (°C.) | 96° | 95° | 118° | 139° |
| Heat Sag[3] (in.) at 275° F./1 hr. | 0.34 | 0.47 | 0.13 | 0.11 |
| Flex strength (kpsi) | 10.7 | 14.3 | 14.3 | 12.8 |
| Flex modulus (kpsi) | 303.6 | 313.7 | 317.4 | 289.1 |

Footnotes to Table II
[1] Ingredients: These are the same reactive ingredients and catalyst described above for runs 1 to 9 with the same triamide of run 8 but with the slightly higher proportion of the propyleneoxy diol to ensure a miscible B blend.
[2] HDT: Heat deflection temperature measured in accordance with ASTM Test Method D-648 and measures the temperature at which the sample begins to deflect when under a pressure of 264 psi.
[3] Heat Sag: Determined by measuring the amount in inches that a one inch wide sample (about 1/8 inch thick) with a six inch unsupported overhang droops under its own weight when held at one end in a horizontal position at the temperature and time set forth above.

EXAMPLE 2

This experiment describes the preparation of six reaction injection molded composites 12 and 13, (a), (b), and (c), respectively, all in accordance with the present invention. The same A and B side reactants in the same proportions as set forth in Example 1 above for the runs 1 through 9 are employed herein except the trimerization catalyst is used in 2 parts by weight. The number 12 set of runs each contain the 3 parts of the identical IMR as used in run 4 of Table I, namely the D400-bisoleamide, while the number 13 set of runs each contain the 3 parts of the T-5000 trisoleamide. The three runs in each series differ in the number of glass mats used and thus their respective weight percent glass content in each molded composite. The number of mats and the glass content for each molding is set forth in Table III below.

A Krauss-Maffei PU-40 RIM machine is employed with the polyisocyanate A tank at about 85° F. The B tank contains the active hydrogen composition with its IMR component also at 85° C. Flow rate is about 60 lbs./minute into a center gated metal mold measuring 36"×16"×3/16" at about 200° F. containing the appropriate number of mats. Demold time is about 45 seconds. Mold preparation is identical to that described in Example 1 with an initial solvent cleaning, external mold application and buffing between each series. Plaque release from the mold is excellent for all series; that is to say, within each series with its respective glass content and IMR agent there are 30 plus releases obtained.

Representative physical properties are set forth in Table III for each type of plaque molded. No loss of properties is observed when compared with a series of (a), (b), and (c) moldings (not shown in Table III) without the IMR agent but also containing 1, 3, and 5 mats, respectively. In fact, all the measured properties set forth in Table III are superior to those of the moldings without the IMR.

TABLE III

| Run | 12a | 12b | 12c | 13a | 13b | 13c |
|---|---|---|---|---|---|---|
| Number of mats[1] | 1 | 3 | 5 | 1 | 3 | 5 |
| Glass content (wt. %) | 15.3 | 39.9 | 55.4 | 15.4 | 38.4 | 55.0 |
| Properties |  |  |  |  |  |  |
| Density g/cc | 1.33 | 1.55 | 1.76 | 1.40 | 1.52 | 1.73 |
| Flex strength (psi) | 19,576 | 35,443 | 46,748 | 18,272 | 37,148 | 49,902 |
| Flex modulus (kpsi) | 588 | 1,103 | 1,636 | 588 | 1,172 | 1,770 |
| Tensile strength (kpsi) | 10.6 | 23.6 | 32.2 | 9.42 | 23.5 | 37.0 |
| HDT (264 psi) °C. | 168° | 212° | 248° | 176° | 222° | 251° |
| Notched Izod[2] ft-lbs/in. | 4.35 | 11.8 | 14.8 | 5.55 | 11.8 | 17.2 |

Footnotes to Table III
[1] Number of mats: Mats are 2 oz/sq. ft. continous strand fiberglass mats. bonded together by a polyester resin and supplied under the designation M-8610 by Owens Corning Fiberglass.
[2] Notched Izod: Impact strength measured in accordance with ASTM Test Method D256-56.

What is claimed is:

1. An active hydrogen composition comprising:
   (A) an organic polyol having a molecular weight of from about 100 to about 4,000 wherein at least about 40 percent of the available hydroxyl groups are primary; and
   (B) from about 0.5 to about 10 pph of (A) of a polyamide formed from the reaction of a $C_2$ to $C_{30}$ aliphatic monocarboxylic acid and a relatively high molecular weight amine terminated polyether.

2. A composition according to claim 1 wherein said (A) comprises a polyalkyleneoxy polyol having a functionality of from about 2 to about 3 and a molecular weight from about 200 to about 1,000.

3. A composition according to claim 1 wherein said (B) is a polyamide formed from the reaction of a $C_8$ to $C_{20}$ saturated or unsaturated aliphatic monocarboxylic acid and a primary amine terminated polyether having a molecular weight from about 200 to about 8,000 and functionality of from about 2 to about 3.

4. A composition according to claim 3 wherein said acid has a $C_{12}$ to $C_{20}$ content and said primary amine terminated polyether has a molecular weight from about 1,000 to about 6,000.

5. A composition according to claim 4 wherein said acid is selected from the group consisting of stearic acid, oleic acid, lauric acid, linoleic acid, palmitic acid, and mixtures thereof.

6. An active hydrogen composition comprising:
   (A) a polyalkyleneoxy diol or triol having a molecular weight from about 200 to about 1,000 and wherein at least about 40 percent of the available hydroxyl groups are primary; and
   (B) from about 1.0 to about 8.0 pph of (A) of a polyamide formed from the reaction of a monocarboxylic acid selected from the group consisting of stearic acid, oleic acid, lauric acid, linoleic acid, palmitic acid, and mixtures thereof and a primary amine terminated polyether having a molecular weight from about 1,000 to about 6,000 and a functionality from about 2 to about 3.

7. A composition according to claim 6 wherein (A) comprises a diol mixture comprising (a) primary and (b) secondary hydroxyl containing diols in such proportions that the total available primary hydroxyl content is at least about 40 percent.

8. A composition according to claim 7 wherein (B) is a diamide derived from oleic acid and a 2,000 molecular weight primary amine terminated polyether of functionality about 2.

9. A composition according to claim 7 wherein (B) is a triamide derived from oleic acid and a 5,000 molecular weight primary amine terminated polyether of functionality about 3.

10. A process for the preparation of a molded polyisocyanurate polymer said process comprising reacting in the presence of a trimerization catalyst:
    I. an organic polyisocyanate; and
    II. an active hydrogen composition according to claim 1 wherein the reactant proportions are such that the equivalents of said (I) are in stoichiometric excess over those of said (II).

11. A process according to claim 10 wherein said (I) is an aromatic polyisocyanate.

12. A process according to claim 10 wherein said (I) is a polymethylene poly(phenyl isocyanate).

13. A process according to claim 10 wherein said (II) comprises:
    (A) a polyalkyleneoxy diol or triol having a molecular weight from about 200 to about 1,000 and wherein at least about 40 percent of the available hydroxyl groups are primary; and (B) from about 1.0 to about 8.0 pph of (A) of a polyamide formed from the reaction of a monocarboxylic acid selected from the group consisting of stearic acid, oleic acid, lauric acid, linoleic acid, palmitic acid, and mixtures thereof and a primary amine terminated polyether having a molecular weight from about 1,000 to about 6,000 and a functionality from about 2 to about 3.

14. A process according to claim 10 wherein the proportions of reactants are such that the ratio of isocyanate equivalents to total active hydrogen equivalents falls in the range of from about 1.5 to about 5.

15. A process according to claim 10 wherein said reacting step comprises the reaction injection molding of said reactants.

16. A process according to claim 15 wherein said reaction injection molding is carried out in the presence of at least one fibrous mat thereby forming a molded composite.

17. A process for the preparation of a molded polyisocyanurate composite comprising at least one fiberglass mat impregnated with said polyisocyanurate said process comprising reaction injection molding into the appropriate mold containing said at least one fiberglass mat the following ingredients:

I. a polymethylene poly(phenyl isocyanate);
II. an active hydrogen composition comprising:

(A) a polyalkyleneoxy diol or triol having a molecular weigth of from about 200 to about 1,000 and wherein at least about 40 percent of the available hydroxyl groups are primary; and (B) from about 1.0 to about 8.0 pph of (A) of a polyamide formed from the reaction of a monocarboxylic acid selected from the group consisting of stearic acid, oleic acid, lauric acid, linoleic acid, palmitic acid, and mixtures thereof and a primary amine terminated polyether having a molecular weight from about 1,000 to about 6,000 and a functionality from about 2 to about 3; and III. a trimerization catalyst, wherein the proportions of reactants are such that the ratio of isocyanate equivalents to total active hydrogen equivalents falls within the range of from about 1.5 to about 5.

18. A process according to claim 17 wherein (A) comprises a mixture comprising (a) a primary hydroxyl diol and (b) a secondary hydroxyl diol in such proportions that the total available primary hydroxyl content is at least about 40 percent.

19. A process according to claim 18 wherein (B) is a diamide derived from oleic acid and a 2,000 molecular weight primary amine terminated polyether of functionality about 2.

20. A process according to claim 18 wherein (B) is a triamide derived from oleic acid and a 5,000 molecular weight primary amine terminated polyether of functionality about 3.

* * * * *